United States Patent [19]

Nikles

[11] 3,910,991
[45] Oct. 7, 1975

[54] 2-ALKINYLOXYPHENYLCARBAMATES

[75] Inventor: Erwin Nikles, Liestal, Switzerland

[73] Assignee: Ciba-Geigy AG, Basel, Switzerland

[22] Filed: June 6, 1974

[21] Appl. No.: 476,963

Related U.S. Application Data

[63] Continuation of Ser. No. 885,331, Dec. 15, 1969, abandoned.

[30] Foreign Application Priority Data

Dec. 20, 1968 Switzerland.................... 19031/68

[52] U.S. Cl.......... 260/479 C; 260/463; 260/615 R; 424/300
[51] Int. Cl.²...................................... C07C 125/06
[58] Field of Search ................................ 260/479 C

[56] References Cited
UNITED STATES PATENTS
3,202,573  8/1965  Haubein.......................... 260/479 C
FOREIGN PATENTS OR APPLICATIONS
937,897  9/1963  United Kingdom............. 260/479 C

*Primary Examiner*—James A. Patten
*Attorney, Agent, or Firm*—Frederick H. Rabin

[57] ABSTRACT

2-Alkinyloxyphenyl-N-methylcarbamates are effective pest control agents, especially against insects and members of the order Acarina. They can be used by themselves or as active ingredients in pesticidal preparations.

5 Claims, No Drawings

2-ALKINYLOXYPHENYLCARBAMATES

This is a continuation of application Ser. No. 885,331, filed on Dec. 15, 1969, now abandoned.

The present invention relates to phenylcarbamates of the formula I, processes for their manufacture and their use by themselves or in preparations for controlling pests.

The present invention provides compounds of the formula I

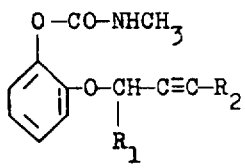

in which the substituents $R_1$ and $R_2$, independently of each other, each represents an alkyl group containing 1 to 4 carbon atoms, or in which one of these substituents may represent a hydrogen atom.

The present invention also provides a process for preparing the compounds of the above formula I, which comprises reacting a phenol of the formula

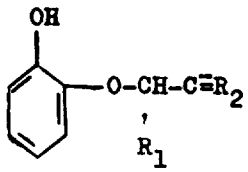

with methylisocyanate, an N-methylcarbamic acid halide or with N-methyl-phenylcarbamate, or by first reacting a phenol of the above formula with $COCl_2$ to give the corresponding haloformic acid phenyl ester or to give the carbonic acid bisphenyl ester, and then reacting the ester with methylamine.

These new carbamates have a wide spectrum of biocidal properties.

They act especially as insecticides and acaricides, primarily against harmful orthoptera, coleoptera, rhynchotes, diptera and lepidoptera. They may be used for controlling a wide variety of storage pests and in domestic hygiene: cockroaches, mealworms, and especially against *sitophilus* species (corn weevil) which are difficult to control can be destroyed with very small amounts of the active substances.

Especially effective are those compounds of the formula I in which one of the substituents $R_1$ and $R_2$ represents a hydrogen atom, a methyl, ethyl or isopropyl group and the other represents a methyl, ethyl, propyl or isopropyl group.

Especially effective are the two compounds

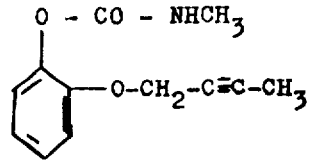

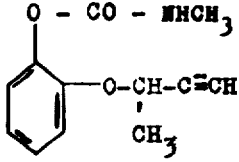

When used in large amounts, the compounds of the formula (1) display against various representatives of mono- or dicotyledonous plant types a growth inhibiting or growth delaying activity.

When used in plant protection in a concentration which does not produce any phytotoxic effects they display an outstanding activity against harmful microorganisms, for example against fungi, for example, against *Altenaria solani*, *Phytophthora infestans* and *Septoria apii*, also against harmful nematodes and their eggs or larvae.

Furthermore, the new substances act quite generally as microbicides, for example, against *Aspergillus* species. They also act against molluscs.

The new preparations can be used in a wide variety of ways and in different forms, for example, in the form of sprays, dusting powders, so-called fly plates or tapes, impregnated with a solution of the active substances, as is generally known to experts and for which applications the present invention provides a few examples. Compare in this connection also U.S. Pat. No. 3,329,702 or British Pat. No. 1,047,644 or Swiss Pat. No. 424,359.

In many cases, as, for example, in combating soil insects, the use of granulates is of advantage to ensure that the active substances are given off uniformly over an extended period of time. Such granulates can be prepared by dissolving the active substance in an organic solvent, absorption of this solution by a granulated material, for example attapulgite or $SiO_2$ or by adsorptive organic high polymers and removal of the solvent. The granulates can also be prepared by mixing an active substance of the formula I with a polymerisable compound, then polymerising the mixture, without affecting the active substance, and carrying out the granulation during the polymerisation.

In whatever form such preparations are they may be distributed (by spraying or dusting) over large surfaces with the aid of aircraft.

The concentration in which the preparation is applied may vary within wide limits depending on the purpose in hand and is in general from 0.01 to 20 percent by weight for rather dilute preparations, while more concentrated one contain 20 to 98 percent by weight of active substance.

By admixture of synergists the activity of the carbamates of this invention can be further increased; for this purpose there are suitable, for example, sesamine, sesamex, piperonylcyclonene, piperonylbutoxide, piperonal bis[2-[2-butoxyethoxy]ethyl]acetate, sulphoxides, propylisome, N-(2-ethylhexyl)-5-norbornene-2,3-dicarboxamide, octachloro-dipropyl ether, 2-nitrophenyl-propargyl ether, 4-chloro-2-nitrophenyl-propargyl ether and 2,4,5-trichlorophenyl-propargyl ether.

The various forms of application of such preparations can be adapted to the individual purpose by admixing with them substances that improve the distribution, the adhesion, the stability towards rain and possibly the penetration, for example, fatty acids, resins, wetting agents, glue, casein or alginates.

The preparations according to this invention may be used by themselves or in conjunction with conventional pest control agents, for example, herbicides, insecticides, acaricides, nematocides, bactericides, fungicides or molluscicides.

The following Examples illustrate the invention. The parts are by weight unless otherwise indicated and temperatures are shown in degrees centigrade.

EXAMPLE 1

2-Butinyloxyphenol

A solution of 122 parts of p-toluenesulphonic acid-2-butinyl ester in 150 parts by volume of acetone is dropped into a boiling mixture of 66 parts of pyrocatechol, 75 parts of potassium carbonate, 91 parts of potassium iodide and 360 parts by volume of acetone. The suspension is refluxed for 24 hours, then cooled, filtered and evaporated. The residue is taken up in ether, repeatedly washed with water and while being cooled with ice extracted with 200 parts by volume of sodium hydroxide solution of 10 percent strength. The alkaline extract is neutralised with hydrochloric acid and the product taken up with chloroform. The solvent is evaporated and the product distilled at a bath temperature of 120°C under 0.05 mm Hg pressure. The distillate crystallises; it melts at 43° to 46°C.

2-(2-Butinyloxy)phenyl-N-methylcarbamate

A solution of 56 parts of 2-(2-butin-1-yloxy)phenol in 150 parts by volume of ethyl acetate is mixed with 0.5. part of triethylenediamine and then portionwise with 21 parts of methylisocyanate.

The mixture is kept for 24 hours at 40°C and then evaporated. The residue is crystallised from chloroform cyclohexane; it melts at 79° to 81°C (Compound No. 1).

EXAMPLE 2

2-(1-Butin-3-yloxy)phenol

A solution of 247 parts of p-toluenesulphonic acid-1-butin-3-yl ester in 200 parts by volume of acetone is dropped at 50°C into a suspension of 110 parts of pyrocatechol, 152 parts of anhydrous potassium carbonate and 166 parts of potassium iodide in 100 parts by volume of acetone. The mixture is refluxed for 2 days, then filtered and evaporated. The residue is taken up in 500 parts by volume of ether, washed with water and with 450 parts by volume of sodium hydroxide solution of 20 percent strength. The alkaline extract, together with the partially precipitated sodium salt of the product, is acidified with semidilute hydrochloric acid while being cooled with ice. The product is obtained by extracting this solution with chloroform and evaporating the extract. For purification it is distilled under a high vacuum.

Boiling point: 63° to 66°C under 0.07 mm Hg. The distillate crystallises; it melts at 52° to 54°C.

2-(1-Butin-3-yloxy)phenyl-N-methylcarbamate

A solution of 45.5 parts of 2-(1-butin-3-yloxy) phenol and 0.1 part of triethylenediamine in 150 parts by volume of carbon tetrachloride is mixed with 19 parts of methylisocyanate. The mixture is stirred for 14 hours at 40°C. The resulting crystalline product is filtered off and once recrystallised from toluene. It melts at 88° to 91°C (Compound No. 2).

The following compounds may be prepared by the same or a similar method:

1. 2-(2-Butinyloxy)phenyl-N-methylcarbamate,
2. 2-(1-Butin-3-yloxy)phenyl-N-methylcarbamate,
3. 2-(2-Pentin-4-yloxy)phenyl-N-methylcarbamate,
4. 2-(2-Pentin-1-yloxy)phenyl-N-methylcarbamate,
5. 2-(1-Pentin-3-yloxy)phenyl-N-methylcarbamate, and
6. 2-(2-Methyl-4-pentin-3-yloxy)phenyl-N-methylcarbamate.

EXAMPLES OF FORMULATIONS

Dusting agent

Equal proportions of an active substance of this invention and of precipitated silicic acid are finely ground together. When this powder is mixed with kaolin or talcum, there result dusting agents preferably having a content of 1 to 6 percent of active substance.

Spray powder

To manufacture a spray powder, for example, the following ingredients are mixed and finely ground together:

50 parts of an active substance according to this invention
20 parts of HISIL (higly adsorptive silica)
25 parts of bolus alba (kaolin)
3.5 parts of a reaction product of P-tertiary octylphenol with ethylene oxide
1.5 parts of sodium salt of 1-benzyl-2-stearylbenzimidazole-6,3'-disulphonic acid.

Emulsion concentrate

Readily soluble active substances can also be formulated as emulsion concentrates in the following manner:

20 parts of active substance
70 parts of xylene
10 parts of a mixture of a reaction product of an alkylphenol with ethylene oxide, with calcium dodecylbenzenesulphonate are mixed together. When this mixture is diluted with water to the desired concentration, a sprayable emulsion results.

Granulate

A solution of 7.5 g of an active substance of the formula I in 100 ml of acetone is poured over 92 g of granulated attapulgite (mesh width: 24/48 mesh per inch). The whole is thoroughly mixed and the solvent removed in a rotary evaporator. The resulting granulate contains 7.5 percent of active substance.

EXAMPLE 3

To test the effect against various storage pests, 2 g of the Compound No. 2 were mixed with 38 g of talcum and the whole was very finely ground. In this manner a dusting powder of good efficacy was obtained, with which the following results were achieved:

| Organisms tested | | Minimum concentration needed for 100% lethal effect within 24 hours' exposure (mg of active substance per square metre) | |
|---|---|---|---|
| | | Compound No. 2 | Compound No. 1 |
| German cockroach (*Phyllodromia germanica*) | | 3 | 6 |
| American cockroach (*Periplaneta americana*) | | 1.5 | 25 |
| Russian cockroach (*Blatta orientalis*) | | 6 | 25 |
| Yellow mealworm beetle (*Tenebrio molitor*) | imago | 50 | 100 |
| | larva | 200 | 200 |
| Bacon beetle (*Dermestes frischii*) | imago | 100 | 50 |
| | larva | 50 | 100 |
| Grain weevil (*Sitophilus granarius*) | | 25 | 200 |
| Fur beetle larva (*Attagenus piceus*) | | 200 | 100 |
| House cricket (*Acheta domestica*) | | 12 | 25 |

EXAMPLE 4

*Lucilia sericata* (Blowfly)

Freshly hatched maggots in small glass vessels were fed horseflesh which had been treated with an aqueous emulsion of the substance under test. The determination of the limit concentration of the active substance was performed in 3 test series on different days, in which new fly generations and new dilution series of 100, 48, 24, 12, 6, 3 and 1.5 ppm were used. After 24 hours the following limit values for a 100 percent lethal effect were obtained:

Compound No. 1 at 3 ppm
Compound No. 2 at 3 ppm

EXAMPLE 5

Activity against female mosquitoes (*Aedes aegypti*)

Female mosquitoes were kept for 6 hours in Petri dishes coated with the substance under test. To produce this coating the bottom half of the dish was first treated with 1 ml of an acetonic solution of the substance and then dried for 1 hour. The solutions used contained 1000, 100, 10 and 1 ppm respectively, which corresponds to a concentration of 1, 0.1, 0.01 and 0.001 mg per dish. The mosquitoes were cooled in ice and 10 females were counted into each dish. For every concentration 4 parallel tests were made.

After 90 minutes the following $LD_{100}$ values were recorded:

| Amount applied (mg per dish) | 1 | 0.1 | 0.01 | 0.001 |
|---|---|---|---|---|
| Compound No. 1 | 100 % | 100 % | 100 % | 75 % |
| Compound No. 2 | 100 % | 100 % | 100 % | 100 % |

EXAMPLE 6

*Cimex lectularius* (Bed bug)

In a similar test to that described in Example 5, in which the active substance is tested on filter paper in plastic dishes (1 mg per dish corresponds to 1 g per 6 m²), and which was repeated twice with 10 bugs each, resulted for the active substance No. 2 at a concentration of 10, 1 and 0.1 mg/dish in a 100 percent lethal effect in each case.

EXAMPLE 7

Contact effect against *Ceratitis capitata*

The bottom half of each Petri dish was treated with 1 ml of an acetonic solution of the substances Nos. 1 and 2 each, which solution contained a specified quantity of active substance. Then the solvent was expelled and deep-cooled fruit flies were placed in the prepared Petri dishes and the lids were then put on. Each dish contained 10 flies. After 1 hour the lethal effect achieved with different concentrations of a dilution series was examined:

| Concentration (ppm) | Compound No. 1 | Compound No. 2 |
|---|---|---|
| 1000 | 100 % | 100 % |
| 100 | 100 % | 100 % |
| 10 | 100 % | 100 % |
| 5 | 100 % | 100 % |
| 2.5 | 100 % | 100 % |
| 1.25 | 100 % | 50 % |

EXAMPLE 8

Stomach and contact effects against *Orgyia gonostigma* and *Epilachna varivestis*

Young mallow plants (*Malva sylvestris*) in pots with about six leaves were immersed in a solution of the active substance of a specific concentration and allowed to dry. Over every plant a cellophane hood containing larvae of *Orgyia gonostigma* in the $L_3$ stage were then placed and fastened with a rubber band. The insecticidal stomach and contact effects were examined 2 and 5 days later. When at the first examination 100 percent mortality is found, the plant is reinfested so that at the same time the activity of the aged preparation can be determined.

The test with larvae of *Epilachna varivestis* in the $L_4$ stage was carried out in an identical manner with Phaseolus as host plant.

(a) Effect against *Orgyia*

| Concentration (ppm) | Compound No. 1 after | | Compound No. 2 after | |
|---|---|---|---|---|
| | 2 days | 5 days | 2 days | 5 days |
| 800 | 100 % | 100 % | 80 % | 100 % |
| 400 | 100 % | 80 % | 80 % | 100 % |
| 200 | 80 % | 100 % | 80 % | 100 % |
| 100 | 60 % | 100 % | — | — |

(a) Effect against *Orgyia*

| Concentration (ppm) | Compound No. 1 after | | Compound No. 2 after | |
|---|---|---|---|---|
| | 2 days | 5 days | 2 days | 5 days |

(b) Effect against *Epilachna* (after 5 days)

| Concentration (ppm) | Compound No. 1 | Compound No. 2 |
|---|---|---|
| 800 | 100 % | 100 % |
| 400 | 100 % | 100 % |
| 200 | 100 % | 60 % |
| 100 | 80 % | — |

I claim:
1. A compound of the formula

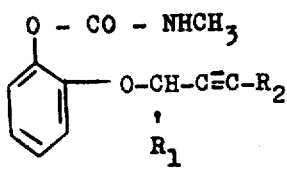

in which the substituents $R_1$ and $R_2$, independently of each other, each represents an alkyl group containing 1 to 4 carbon atoms or in which one of the two substituents may also represent a hydrogen atom.

2. A compound according to claim 1, wherein one of the substituents $R_1$ or $R_2$ represents a hydrogen atom, a methyl, ethyl or isopropyl group and the other represents a methyl, ethyl, propyl or isopropyl group.

3. The compound of the formula

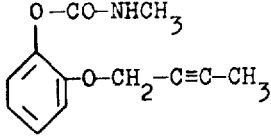

according to claim 1.

4. The compound of the formula

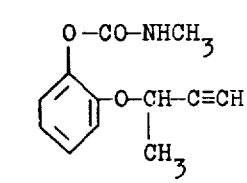

according to claim 1.

5. The compound of the formula

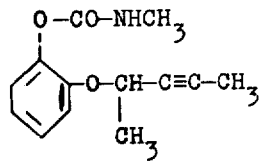

according to claim 1.